US009070048B2

United States Patent
Sinha et al.

(10) Patent No.: US 9,070,048 B2
(45) Date of Patent: Jun. 30, 2015

(54) METHOD AND APPARATUS FOR AUTOMATICALLY IDENTIFYING A REPRESENTATIVE IMAGE FOR AN IMAGE GROUP

(71) Applicant: Adobe Systems Incorporated, San Jose, CA (US)

(72) Inventors: Rishi Ranjan Sinha, Ghaziabad (IN); Swapnil Shrivastava, Ghaziabad (IN); Sumit Dey, Noida (IN)

(73) Assignee: ADOBE SYSTEMS INCORPORATED, San Jose, CA (US)

( * ) Notice: Subject to any disclaimer, the term of this patent is extended or adjusted under 35 U.S.C. 154(b) by 98 days.

(21) Appl. No.: 14/056,451

(22) Filed: Oct. 17, 2013

(65) Prior Publication Data

US 2015/0110407 A1    Apr. 23, 2015

(51) Int. Cl.
*G06K 9/00* (2006.01)
*G06K 9/62* (2006.01)
*G06K 9/68* (2006.01)

(52) U.S. Cl.
CPC ............ *G06K 9/6285* (2013.01); *G06K 9/6807* (2013.01); *G06K 9/6215* (2013.01); *G06K 9/6267* (2013.01); *G06K 9/6218* (2013.01)

(58) Field of Classification Search
None
See application file for complete search history.

(56) References Cited

U.S. PATENT DOCUMENTS

| 2002/0033848 | A1* | 3/2002 | Sciammarella et al. | 345/838 |
|---|---|---|---|---|
| 2005/0027712 | A1* | 2/2005 | Gargi et al. | 707/100 |
| 2006/0242567 | A1* | 10/2006 | Rowson et al. | 715/517 |
| 2007/0103565 | A1* | 5/2007 | Xu et al. | 348/231.2 |
| 2007/0136275 | A1* | 6/2007 | Wan | 707/5 |
| 2008/0075338 | A1* | 3/2008 | Muramatsu et al. | 382/118 |
| 2008/0205772 | A1* | 8/2008 | Blose et al. | 382/225 |
| 2010/0114891 | A1* | 5/2010 | Oami | 707/737 |
| 2010/0278396 | A1* | 11/2010 | Mitsuhashi et al. | 382/118 |
| 2011/0123124 | A1* | 5/2011 | Peters | 382/225 |
| 2012/0082378 | A1* | 4/2012 | Peters et al. | 382/165 |
| 2013/0011083 | A1* | 1/2013 | Berkovich et al. | 382/305 |
| 2013/0064476 | A1* | 3/2013 | Cohen et al. | 382/305 |
| 2014/0169673 | A1* | 6/2014 | Liu et al. | 382/170 |
| 2014/0270547 | A1* | 9/2014 | Dwan et al. | 382/224 |

(Continued)

OTHER PUBLICATIONS

Jang, Chul-Jin, et al. "Smart management system for digital photographs using temporal and spatial features with exif metadata." Digital Information Management, 2007. ICDIM'07. 2nd International Conference on. vol. 1. IEEE, 2007.*

(Continued)

*Primary Examiner* — Aaron W Carter
*Assistant Examiner* — Narek Zohrabyan
(74) *Attorney, Agent, or Firm* — Keller Jolley Preece

(57) ABSTRACT

A computer implemented method and apparatus for automatically identifying a representative image for an image group. The method comprises dividing an image group into one or more clusters based on an average time gap of the image group, wherein the images in the image group are in sequential timestamp order wherein the average time gap is calculated using a time span calculated from the timestamp of a first image in the image group to the timestamp of a last image in the image group; recursively dividing a largest cluster in the one or more clusters to determine a resultant cluster, wherein the resultant cluster comprises no time gaps larger than the average time gap of the resultant cluster; and identifying a representative image from the resultant cluster as an image representative for the image group.

20 Claims, 4 Drawing Sheets

(56) References Cited

U.S. PATENT DOCUMENTS

2014/0270550 A1* 9/2014 Dwan et al. .................. 382/225
2015/0016751 A1* 1/2015 Bercovich et al. ............ 382/305

OTHER PUBLICATIONS

Graham, Adrian, et al. "Time as essence for photo browsing through personal digital libraries." Proceedings of the 2nd ACM/IEEE-CS joint conference on Digital libraries. ACM, 2002.*

Loui, Alexander C., and Andreas Savakis. "Automated event clustering and quality screening of consumer pictures for digital albuming." Multimedia, IEEE Transactions on 5.3 (2003): 390-402.*

Cooper, Matthew, et al. "Temporal event clustering for digital photo collections." ACM Transactions on Multimedia Computing, Communications, and Applications (TOMCCAP) 1.3 (2005): 269-288.*

* cited by examiner

METHOD AND APPARATUS FOR AUTOMATICALLY IDENTIFYING A REPRESENTATIVE IMAGE FOR AN IMAGE GROUP

BACKGROUND

1. Field of the Invention

Embodiments of the present invention generally relate to image identification and, more particularly, to a method and apparatus for automatically identifying a representative image for an image group.

2. Description of the Related Art

In many image processing applications, image groups are denoted by a representative thumbnail (an image, typically of reduced size, used in order to represent multiple images). The thumbnail helps a user to identify what images are in the image group. Typically, a first image in a group is used as the representative thumbnail. Some image processing applications allow for the representative thumbnail to be manually selected by a user.

However, the first image is often not a good representation of the image group and manual intervention to select a representative image is time consuming and diminishes the user experience.

Therefore, there is a need for a method and apparatus for automatically identifying a representative image for an image group.

SUMMARY

A method for automatically identifying a representative image for an image group is described. The method accesses a plurality of images, wherein the plurality of images comprise a time span from a timestamp of a first image to a last image. The images are in sequential timestamp order where a time gap identifies a time span between two sequential timestamps. The images are divided into one or more clusters based on an average time gap of the plurality of images. The largest cluster is selected from the one or more clusters and recursively subdivided into successively smaller clusters until a single resultant cluster remains. A representative image is selected from the resultant cluster by selecting an image near a center of the time span of one of the successively smaller clusters.

In another embodiment, an apparatus for identifying a representative image for an image group. The apparatus includes an image selection module for accessing a plurality of images. The image selection module takes a plurality of images that are in sequential timestamp order and divides them into clusters based on an average time gap for the plurality of images. The largest cluster is selected and is recursively subdivided until a cluster remains that can no longer be subdivided. An image near the center of the resultant clusters is selected as the representative image for the image group.

In yet another embodiment, a computer readable medium for storing computer instructions, that when executed perform a method for identifying a representative image for an image group. The method accesses a plurality of images, wherein the plurality of images comprise a time span from a timestamp of a first image to a last image. The images are in sequential timestamp order where a time gap identifies a time span between two sequential timestamps. The images are divided into one or more clusters based on an average time gap of the plurality of images. The largest cluster is selected from the one or more clusters and recursively subdivided into successively smaller clusters. A representative image is selected from the resultant cluster by selecting an image near a center of the time span of one of the successively smaller clusters.

The Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Figure 1:
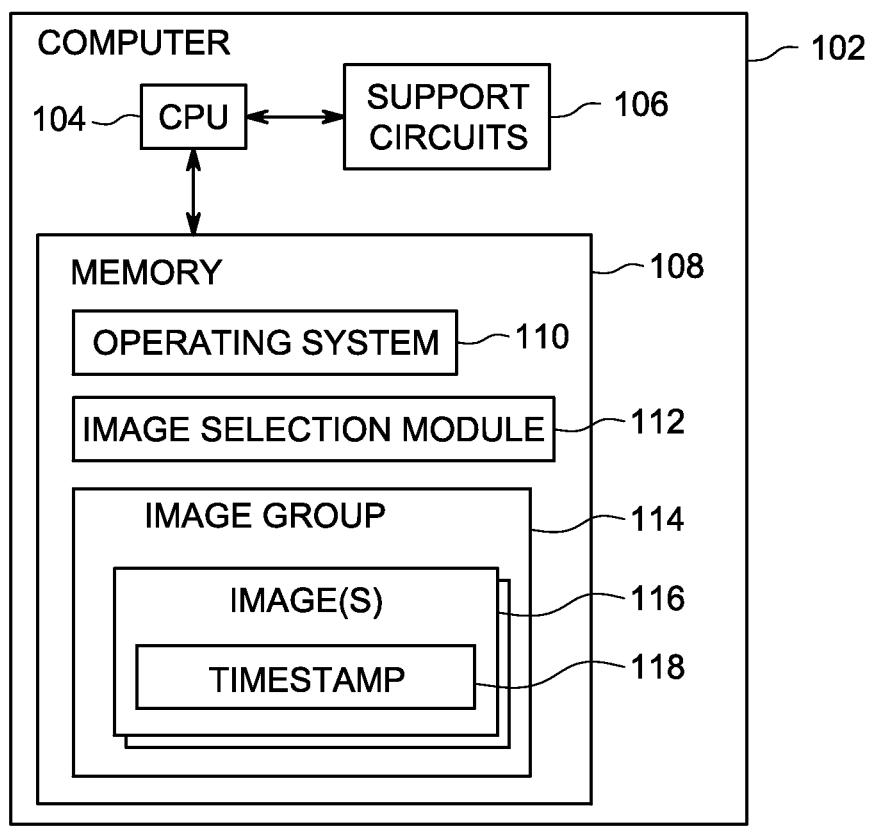
FIG. 1 is a block diagram of a system for automatically identifying a representative image for an image group, according to one or more embodiments.

While the method and apparatus is described herein by way of example for several embodiments and illustrative drawings, those skilled in the art will recognize that the method and apparatus for automatically identifying a representative image for an image group is not limited to the embodiments or drawings described. It should be understood, that the drawings and detailed description thereto are not intended to limit embodiments to the particular form disclosed. Rather, the intention is to cover all modifications, equivalents and alternatives falling within the spirit and scope of the method and apparatus for automatically identifying a representative image for an image group defined by the appended claims. Any headings used herein are for organizational purposes only and are not meant to limit the scope of the description or the claims. As used herein, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

Embodiments of the present invention include a method and apparatus for automatically identifying a representative image for an image group. The embodiments are based on a philosophy that people take many pictures quickly when an important or exciting event occurs. The images are sequentially sorted based on the time at which the image was captured (i.e., their timestamp). The images are divided into clusters based on time gaps within the sequence of timestamps. The largest image cluster is identified. A recursive algorithm continues to divide the largest cluster into smaller clusters. The recursive algorithm continues to divide each resultant largest cluster into smaller clusters until the smaller clusters can no longer be divided. A central image in a final resultant smaller cluster is chosen as the representative image.

Advantageously, using the embodiments of the invention described herein, software applications such as PHOTO-SHOP® ELEMENTS®, ADOBE® Bridge, LIGHT- ROOM®, PHOTOSHOP® CAMERA RAW®, ADOBE® REVEL®, and the like that store image groups for a user can provide a user with a representative thumbnail for their image group without manual intervention.

Various embodiments of a method and apparatus for automatically identifying a representative image for an image group are described. In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description that follow are presented in terms of algorithms or symbolic representations of operations on binary digital signals stored within a memory of a specific apparatus or special purpose computing device or platform. In the context of this particular specification, the term specific apparatus or the like includes a general-purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

FIG. 1 is a block diagram of an apparatus 100 for automatically identifying a representative image for an image group, according to one or more embodiments. The apparatus 100 includes a computer 102. The computer 102 is a computing device, for example, a desktop computer, laptop, tablet computer, and the like. The computer 102 includes a Central Processing Unit (CPU) 104, support circuits 106, and a memory 108. The CPU 104 may include one or more commercially available microprocessors or microcontrollers that facilitate data processing and storage. The various support circuits 106 facilitate the operation of the CPU 104 and include one or more clock circuits, power supplies, cache, input/output circuits, and the like. The memory 108 includes at least one of Read Only Memory (ROM), Random Access Memory (RAM), disk drive storage, optical storage, removable storage and/or the like.

The memory 108 includes an operating system 110, an image selection module 112, and an image group 114. The image group 114 includes a plurality of images 116. Each image 116 includes a timestamp 118 indicating when the image was captured. The operating system 110 may include various commercially known operating systems.

The image selection module 112 accesses the image group 114 in order to identify a representative image from within the image group 114. Often, people take many pictures quickly when an important or exciting event occurs. For example, during a birthday party, many pictures are taken during the cake cutting ceremony. The cake cutting ceremony may represent a short period of time compared to the length of the birthday party, but may include the most number of pictures that represent the group of images from the birthday party. Hence, the embodiments consider a group of images 114 for which a representative thumbnail needs to be determined. The image selection module 112 sorts the images 116 in the image group 114. The images may be sorted in ascending or descending order based on the timestamp 118 of each image 116. The image selection module 112 then calculates an average time gap for the image group 114. A time gap is a time span between two sequential timestamps (i.e., the time an image was captured). For example, if a first image (I1) is captured at 00:00:02 and a second image (I3) is captured at 00:00:05, there is a time gap of 00:00:03 or 3 seconds between the two images.

The image selection module 112 divides the image group 114 into smaller clusters. Each cluster is created by dividing the image group 114 into smaller groups. An average time gap is calculated for the image group 114. For example, suppose the image group also includes a third image (I3) captured at time 00:00:07, and a fourth image (I4) captured at time 00:00:09. The image group 114 is divided into smaller clusters, where the divisions are at time gaps within the image group 114 that are greater than the average time gap for the image group 114. In the current example, the time gap between I1 and I2=3 seconds. The time gap between I2 and I3=2 seconds, and the time gap between I3 and I4=2 seconds. The average time gap 2.3 seconds. The time gap between I1 and I2=3 seconds, which is greater than the average time gap. Therefore, the image group is divided into two smaller clusters where the division is at the time gap between I1 and I2. Cluster 1 includes I1 and Cluster 2 includes I2, I3, and I4. The image selection module 112 repeats the division process with the largest cluster. Based on the philosophy that many pictures are taken quickly during an important event, it is assumed that a representative image is included in the largest cluster. The image selection module 112 iterates until a largest cluster remains that cannot be further divided. This happens when there are two images remaining or when all images remaining are equidistant in terms of time. In the current example, cluster 2 includes I2, I3, and I4. The time gap between I2 and I3=2 seconds. The time gap between I3 and I4=2 seconds. Therefore, all images in the cluster are equidistant in terms of time and the cluster cannot be further divided. In other embodiments, not specifically described herein, it may be desirable for the iteration to stop before the successively smaller clusters can no longer be divided.

The image selection module 112 calculates the number of images remaining in the resultant cluster. If the number is odd, the image selection module 112 identifies the central image (i.e., the image that includes a median timestamp in the resultant cluster as the representative image of the image group. If the number is even, the image selection module 112 determines the leftmost image in the cluster. The leftmost image is the first image, based on its timestamp, in the cluster. In one embodiment, the leftmost image is the first image in the cluster with lowest timestamp if the images are sorted in ascending order of timestamps. In another embodiment, the leftmost image is the first image in the cluster with greatest timestamp is the images are sorted in descending order of the timestamps. The image selection module 112 calculates the time gap between the leftmost image in the cluster and its outside neighbor (i.e., image to the left of the leftmost image outside of the cluster). The image selection module 112 then determines the rightmost image in the cluster. The rightmost image is the last image, based on its timestamp, in the cluster. In an illustrated embodiment, the last image is the image with the greatest timestamp in the cluster. The image selection module 112 calculates the time gap between the rightmost image in the cluster and its outside neighbor (i.e., image to the right of the rightmost image outside of the cluster). If the time gap for the leftmost image is less than the time gap for the right most image, the image selection module 112 identifies the image just left of center (i.e., the image on the left of the two central images) as the representative image of the image group. Similarly, if the time gap for the right most image is less than the time gap for the left most image, the image selection module 112 identifies the image just right of center (i.e., the image on the right of the two central images) as the representative image of the image group. For example, if there are four images, I1, I2, I3, and I4 in the cluster, with corresponding timestamps T1, T2, T3, and T4, wherein T1<T2<T3<T4, the images I2 and I3 are the two central images. I2 is the image on the left of the two central images. I3 is the image on the right of the two central images.

Figure 2:
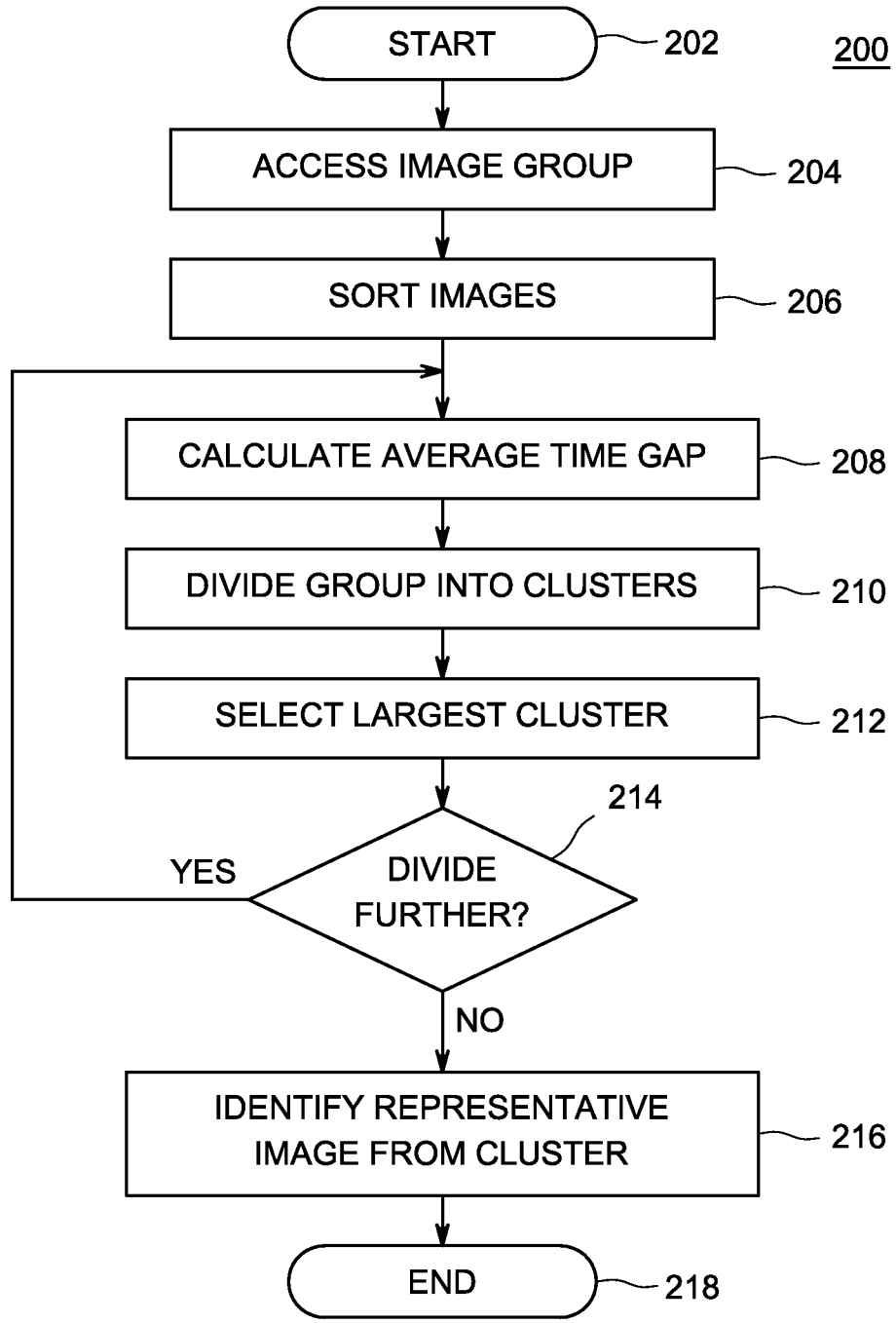
FIG. 2 depicts a flow diagram of a method for automatically identifying a resultant cluster within an image group as performed by the image selection module of FIG. 1, according to one or more embodiments.

FIG. 2 depicts a flow diagram of a method 200 for automatically identifying a resultant cluster within an image group as performed by the image selection module 112 of FIG. 1, according to one or more embodiments. The method 200 divides an image group into clusters and subdivides the cluster based on time gaps until, in accordance with this embodiment, a resultant cluster cannot be further divided. The assumption is that the largest cluster is representative of the most important portion of the image group; thus, the method 200 focuses on the largest cluster during each division. The method 200 starts at step 202 and proceeds to step 204. At step 204, the method 200 accesses an image group. The image group includes a plurality of images. Each image in the plurality of images includes a timestamp.

The method 200 proceeds to step 206, where the method 200 sorts the images according to their timestamp. The method 200 may sort the images in ascending or descending order. The method 200 proceeds to step 208, where the method 200 calculates an average time gap for the images. The average time gap is calculated using the following formula:

$$\text{average time gap} = \frac{\text{total time span for images}}{\text{number of gaps within total time span}} \quad \text{Eq. 1}$$

The total time span for the images may be calculated by subtracting the time stamp of an image in the cluster with the lowest time stamp from the time stamp of the image in the cluster with the greatest time stamp.

The method 200 proceeds to step 210, where the method 200 divides the group of images into smaller clusters. The method 200 divides the images where a time gap between images is greater than the calculated average time gap. The method 200 calculates a number of division points where the image group was divided.

The method 200 proceeds to step 212, where the method 200 selects the largest cluster, meaning the cluster containing the most number of images. Based on the assumption that the largest cluster is representative of the most important portion of the image group, the largest cluster is selected. If two or more clusters have the same number of images, the cluster with minimum time span for the images is selected.

The method 200 proceeds to step 214, where the method 200 determines whether the clusters can be further divided. A cluster cannot be further divided when there are two images remaining in the cluster, or when all images in the cluster are equidistant in terms of time. For example, if a cluster includes four images that have timestamps of 00:02, 00:04, 00:06, and 00:08, then the average time gap is 2 seconds. Because no time gap is greater than the average time gap, the cluster cannot be divided further. If the timestamps were not equidistant, then mathematically, there would be a time gap that was greater than the average time gap. If the method 200 determines that the images can be further divided, the method 200 selects the largest cluster in the divided images and proceeds to step 208. As described above, at step 208, the average time gap for the cluster is calculated and the cluster is further divided. The process iterates until a resultant cluster cannot be further divided at which time the method 200 proceeds to step 216.

However, if at step 214, the method 200 determines that the images cannot be further divided, the method 200 proceeds to step 216, where the method 200 identifies a representative image from the resultant cluster, as described in further detail with respect to FIG. 3 below. The method 200 proceeds to step 218 and ends.

Figure 3:
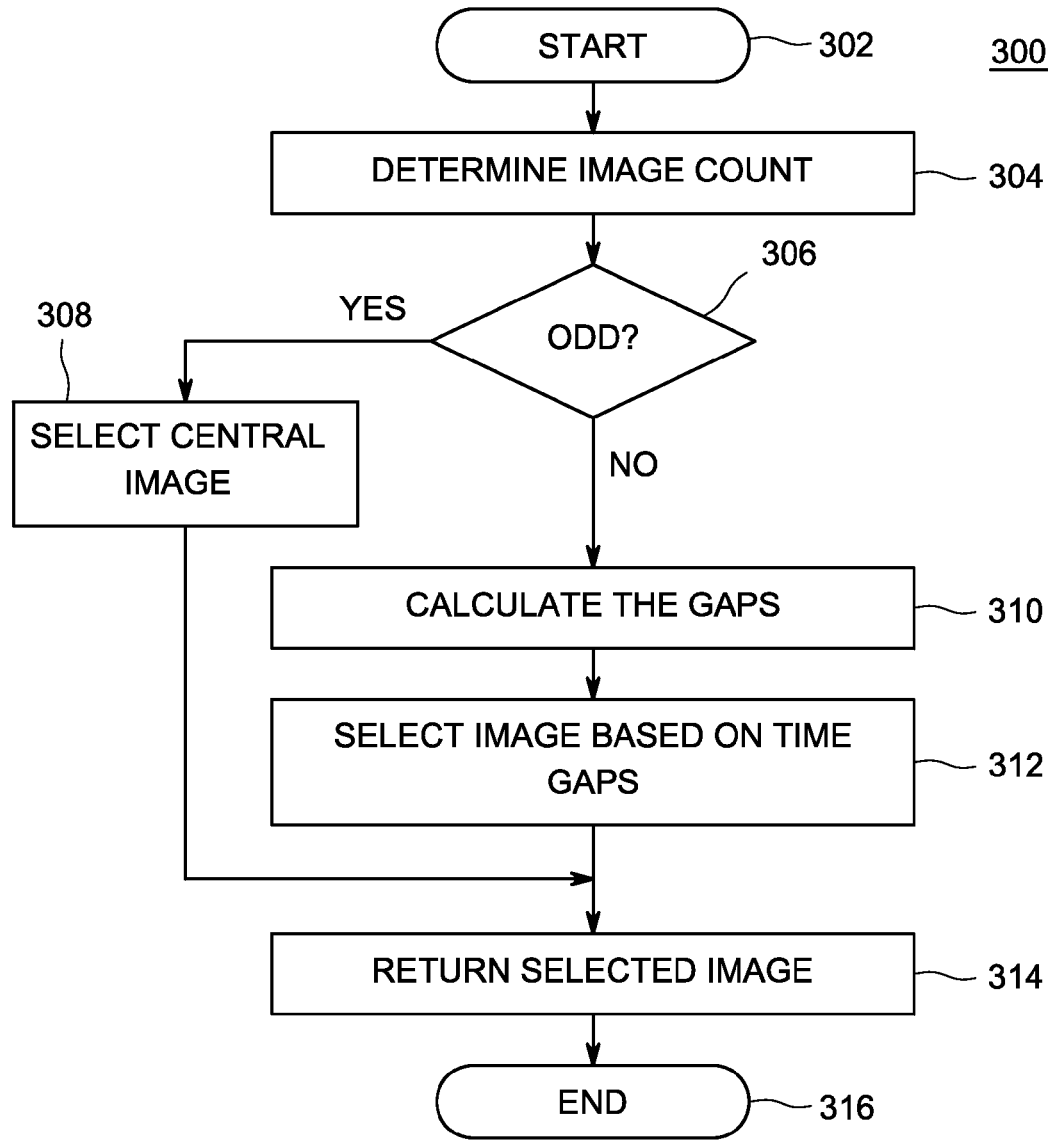
FIG. 3 depicts a flow diagram of a method for automatically identifying a representative image from within a resultant cluster as performed by the image selection module, according to one or more embodiments.

FIG. 3 depicts a flow diagram of a method 200 for automatically identifying a representative image from within a resultant cluster as performed by the image selection module 112 of FIG. 1, according to one or more embodiments. The resultant cluster is assumed to be the largest cluster after each division process. The method 300 determines a central image within the resultant cluster that represents the entire image group. The method 300 starts at step 302 and proceeds to step 304.

At step 304, the method 300 determines an image count for the resultant cluster. The method 300 proceeds to step 306, where the method 300 determines whether the image count is odd or even. If the method 300 determines that the image count is odd, the method 300 proceeds to step 308. At step 308, the method 300 selects the central image in the cluster as the representative image. The central image is found at a position calculated as follows:

$$\text{position} = \frac{\text{number of images in cluster} + 1}{2} \quad \text{Eq. 2}$$

The method 300 proceeds to step 314.

However, if at step 306, the method 300 determines the number of images in the cluster is even, the method 300 proceeds to step 310, where the method 300 calculates time gaps between the leftmost and rightmost images and their nearest neighbors outside of the cluster, according to their time stamps, as described in further detail with respect to FIG. 4 below. The leftmost image is the first image, based on its timestamp, in the cluster. The rightmost image is the last image, based on its timestamp, in the cluster. The method 300 calculates the time gap between the leftmost image in the cluster and the image immediately preceding the leftmost image in time, outside the cluster. This time gap is referred to as the left side gap (LSG). The method 300 also calculates the time gap between the rightmost image in the cluster and the image immediately following the rightmost image in time, outside the cluster. This time gap is referred to as the right side gap (RSG).

The method 300 proceeds to step 312, where the method 300 selects an image based on the LSG and the RSG. When the number of images is even, there is no central image because when the image count in the cluster is divided in half, there are an equal number of images left of center as there are right of center. For example, if the image group includes four images I1, I2, I3, and I4, with corresponding timestamps T1, T2, T3, and T4, such that T1<T2<T3<T4, there is not a central image. More specifically, no image exists within the cluster such that a same number of images have a timestamp later than the timestamp of the image as have a timestamp earlier than the timestamp of the image. Of the two images, i.e., one to the immediately left of center and one immediately right of center, namely, I2 and I3, one image is selected as the representative image based on the LSG and the RSG. If the LSG is less than the RSG, meaning the gap between the leftmost image and its outside neighbor is less than the gap between the rightmost image and its outside neighbor, then the method 200 selects the image immediately left of center as the representative image for the image group. In the present example, if LSG<RSG, the image to the immediate left of center, I2, corresponds to the largest cluster of the images captured in quick succession and hence, is selected as the representative image. However, if the RSG is less than the LSG, then the method 200 selects the image immediately right of center as the representative image for the image group. As such, in the present example, if the LSG>RSG, the image to the immediate right of center, I3, corresponds to the largest cluster of the images captured in quick succession and hence, is selected as the representative image. The method 300 proceeds to step 314.

At step 314, the method 300 returns the selected representative image. Hence, a representative image for an image group is determined using a time-based clustering method that intelligently selects a representation without manual intervention.

The representative image may be used as a thumbnail to represent a folder of images on a hard drive of a computer. Alternatively, the representative image may be used to represent image groups in applications such as ADOBE PHOTOSHOP ELEMENTS, and the like. The representative image may be used by social media sites to represent a photo album or by any photo repository in the cloud, such as ADOBE REVEL to provide a user with a representative image from a group of images. The method 300 proceeds to step 316 and ends.

Figure 4A:
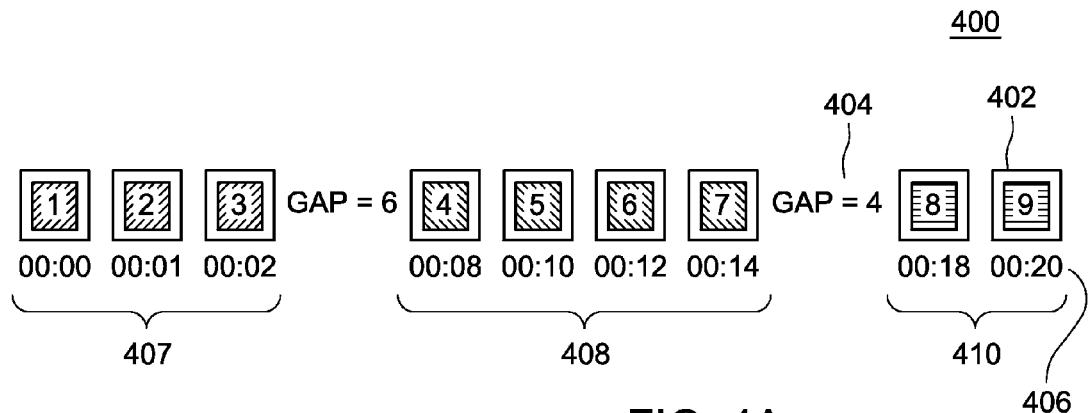
FIGS. 4A-4D collectively illustrate selecting a representative image from an image group, according to one or more embodiments.

FIGS. 4A-4D collectively illustrate selecting a representative image from an image group, according to one or more embodiments. FIG. 4A illustrates an image group 400. The image group 400 includes nine (9) images 402. Each image 402 includes a timestamp 406 that represents when the image 402 was captured. In the illustrated example, the images 402 are arranged in ascending order based on timestamp 406. There is a time gap 404 between two consecutive images 402. There are nine (9) images 402 and eight (8) time gaps. An average time gap is calculated for the image group 400 using Eq. 1, as illustrated in conjunction with FIG. 2. The time span for the image group=00:20–00:00, or 00:20. The average time gap is calculated as 00:20/8=2.50 seconds.

Time gap 404 for each two consecutive images is compared against the average time gap. Each time gap 404 greater than the average time gap indicates a division point. In the illustrated example, each time gap 404 greater than 2.5 is a dividing point. The time gap 404 between image 3 and image 4 is 6 seconds. The time gap 404 between image 7 and image 8 is four seconds. The image group 400 is divided at the location of these time gaps. The image group 400 is now composed of three clusters, 407, 408, and 410. The largest cluster (i.e., the cluster having the highest number of images) is determined. The largest of these clusters 408 is selected as the cluster including the representative image.

Figure 4B:
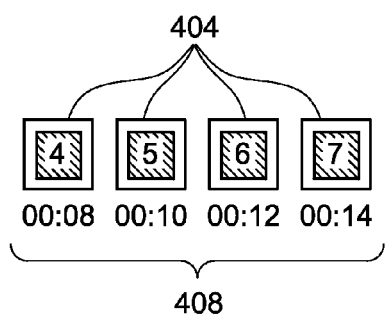

FIG. 4B illustrates processing the largest cluster 408. Cluster 408 has a time span of 6 seconds and an average time gap of 2. Because the time gaps 404 are less than or equal to the average time gap, the cluster 408 cannot be further divided. Hence, cluster 408 is referred to as the resultant cluster.

Figure 4C:
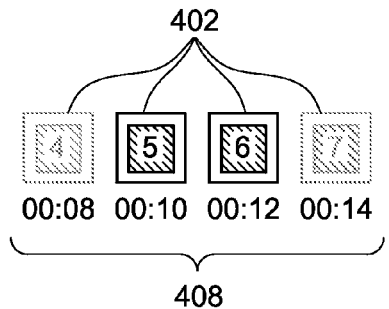

FIG. 4C illustrates how the selection of a representative image is performed. A count of a number of images is determined. The cluster 408 includes 4 images 402. When the number of images is even, the two central images 402 are selected. In the illustrated example, image 5 to the immediate left of center and image 6 to the immediate right of center are selected. Either image 5 or image 6 is selected as the representative image.

Figure 4D:
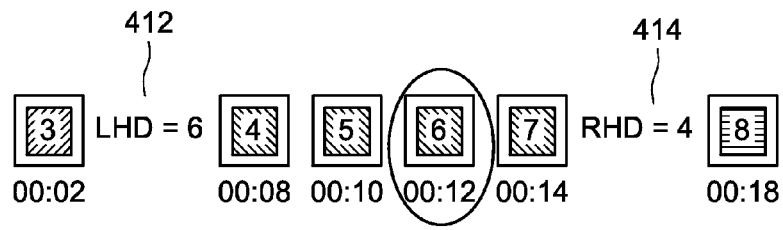

FIG. 4D illustrates how the representative image is selected. A time gap is determined between the leftmost image in the cluster and the image immediately preceding the leftmost image in time, outside the cluster. This time gap is referred to as the left side gap (LSG) 412. A time gap is determined between the rightmost image in the cluster and the image immediately following the rightmost image in time, outside the cluster. This time gap is referred to as the right side gap (RSG) 414. The LSG 412 is 6 and the RSG 414 is 4. Because the LSG>RSG, the image is closer to the RSG is selected as the representative image. Image 6 is the image closer to the RSG and hence image 6 is selected as the representative image.

The embodiments of the present invention may be embodied as methods, apparatus, electronic devices, and/or computer program products. Accordingly, the embodiments of the present invention may be embodied in hardware and/or in software (including firmware, resident software, micro-code, etc.), which may be generally referred to herein as a "circuit" or "module". Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device. These computer program instructions may also be stored in a computer-usable or computer-readable memory that may direct a computer or other programmable data processing apparatus to function in a particular manner, such that the instructions stored in the computer usable or computer-readable memory produce an article of manufacture including instructions that implement the function specified in the flowchart and/or block diagram block or blocks.

The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium include the following: hard disks, optical storage devices, a transmission media such as those supporting the Internet or an intranet, magnetic storage devices, an electrical connection having one or more wires, a portable computer diskette, a random access memory (RAM), a read-only memory (ROM), an erasable programmable read-only memory (EPROM or Flash memory), an optical fiber, and a compact disc read-only memory (CD-ROM).

Computer program code for carrying out operations of the present invention may be written in an object oriented programming language, such as Java®, Smalltalk or C++, and the like. However, the computer program code for carrying out operations of the present invention may also be written in conventional procedural programming languages, such as the "C" programming language and/or any other lower level assembler languages. It will be further appreciated that the functionality of any or all of the program modules may also be implemented using discrete hardware components, one or more Application Specific Integrated Circuits (ASICs), or programmed Digital Signal Processors or microcontrollers.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to explain the principles of the present disclosure and its practical applications, to thereby enable others skilled in the art to best utilize the invention and various embodiments with various modifications as may be suited to the particular use contemplated.

The methods described herein may be implemented in software, hardware, or a combination thereof, in different embodiments. In addition, the order of methods may be changed, and various elements may be added, reordered, combined, omitted, modified, etc. All examples described herein are presented in a non-limiting manner. Various modifications and changes may be made as would be obvious to a person skilled in the art having benefit of this disclosure. Realizations in accordance with embodiments have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

While the foregoing is directed to embodiments of the present invention, other and further embodiments of the invention may be devised without departing from the basic scope thereof, and the scope thereof is determined by the claims that follow.

The invention claimed is:

1. A computer implemented method comprising:
dividing an image group of time sequential images into a plurality of clusters based on an average time gap of the image group;
recursively dividing a largest cluster in the plurality of clusters to determine a resultant cluster, wherein the resultant cluster comprises no time gaps larger than an average time gap of the resultant cluster; and
identifying a representative image from the resultant cluster as an image representative for the image group.

2. The method of claim 1, wherein each image in the image group comprises a timestamp, and wherein the average time gap is calculated as the timestamp of a last image in the image group or resultant cluster minus the timestamp of a first image in the image group or resultant cluster, divided by a total number of gaps in the image group or resultant cluster.

3. The method of claim 1, wherein dividing the image group comprises:
sorting a plurality of images in the image group based on time;
calculating the average time gap for the plurality of images; and
dividing the plurality of images into clusters wherein the division occurs where the time gap between two images is greater than the average time gap.

4. The method of claim 1, wherein recursively dividing continues until only two images remain in the resultant cluster or when all remaining images in the resultant cluster are equidistant in terms of time.

5. The method of claim 1, wherein identifying the representative image when the resultant cluster includes an odd number of images comprises selecting an image at a center of the resultant cluster.

6. The method of claim 1, wherein identifying the representative image when the resultant cluster includes an even number of images comprises:
calculating a left side time gap (LSG) between a leftmost image in the resultant cluster and an image immediately preceding the leftmost image, wherein the image immediately preceding the leftmost image is outside of the resultant cluster, and
calculating a right side time gap (RSG) between a rightmost image in the resultant cluster and an image immediately following the rightmost image, wherein the image immediately following the rightmost image is outside of the resultant cluster.

7. The method of claim 6, further comprising selecting an image in a position immediate left of center of the resultant cluster when the LSG is less than the RSG and selecting an image in a position immediately right of center of the resultant cluster when the RSG is less than the LSG.

8. An apparatus for identifying a representative image for an image group comprising:
a computer having one or more processors and further comprising:
an image selection module for dividing an image group of time sequential images into a plurality of clusters based on an average time gap of the image group; recursively dividing a largest cluster in the plurality of clusters to determine a resultant cluster, wherein the resultant cluster comprises no time gaps larger than an average time gap of the resultant cluster; and identifying a representative image from the resultant cluster as an image representative for the image group.

9. The apparatus of claim 8, wherein each image in the image group comprises a timestamp, and wherein the average time gap is calculated as the timestamp of a last image in the image group or resultant cluster minus the timestamp of a first image in the image group or resultant cluster, divided by a total number of gaps in the image group or resultant cluster.

10. The apparatus of claim 8, wherein dividing the image group comprises:

sorting a plurality of images in the image group based on time;

calculating the average time gap for the plurality of images; and dividing the plurality of images into clusters wherein the division occurs where the time gap between two images is greater than the average time gap.

11. The apparatus of claim 8, wherein recursively dividing continues until only two images remain in the resultant cluster or when all remaining images in resultant cluster are equidistant in terms of time.

12. The apparatus of claim 8, wherein identifying the representative image when the resultant cluster includes an odd number of images comprises selecting an image at a center of the resultant cluster.

13. The apparatus of claim 8, wherein identifying the representative image when the resultant cluster comprises an even number of images comprises:

calculating a left side time gap (LSG) between a leftmost image in the resultant cluster and an image immediately preceding the leftmost image, wherein the image immediately preceding the leftmost image is outside of the resultant cluster;

calculating a right side time gap (RSG) between a rightmost image in the resultant cluster and an image immediately following the rightmost image, wherein the image immediately following the rightmost image is outside of the resultant cluster; and selecting an image in a position immediate left of center of the resultant cluster when the LSG is less than the RSG and selecting an image in a position immediately right of center of the resultant cluster when the RSG is less than the LSG.

14. A non-transient computer readable medium for storing computer instructions that, when executed by at least one processor causes the at least one processor to perform a method for identifying a representative image for an image group comprising:

dividing an image group of time sequential images into a plurality of clusters based on an average time gap of the image group;

recursively dividing a largest cluster in the plurality of clusters to determine a resultant cluster, wherein the resultant cluster comprises no time gaps larger than an average time gap of the resultant cluster; and identifying a representative image from the resultant cluster as an image representative for the image group.

15. The computer readable medium of claim 14, wherein each image in the image group comprises a timestamp, wherein the average time gap is calculated as the timestamp of a last image in the image group or resultant cluster minus the timestamp of a first image in the image group or resultant cluster, divided by a total number of gaps in the image group or resultant cluster.

16. The computer readable medium of claim 14, wherein dividing the image group comprises:

sorting a plurality of images in the image group based on time;

calculating the average time gap for the plurality of images; and dividing the plurality of images into clusters wherein the division occurs where the time gap between two images is greater than the average time gap.

17. The computer readable medium of claim 14, wherein recursively dividing continues until only two images remain in the resultant cluster or when all remaining images in the resultant cluster are equidistant in terms of time.

18. The computer readable medium of claim 14, wherein identifying the representative image when the resultant cluster includes an odd number of images comprises selecting an image at a center of the resultant cluster.

19. The computer readable medium of claim 14, wherein identifying the representative image when the resultant cluster comprises an even number of images comprises:

calculating a left side time gap (LSG) between a leftmost image in the resultant cluster and an image immediately preceding the leftmost image, wherein the image immediately preceding the leftmost image is outside of the resultant cluster, and calculating a right side time gap (RSG) between a rightmost image in the resultant cluster and an image immediately following the rightmost image, wherein the image immediately following the rightmost image is outside of the resultant cluster.

20. The computer readable medium of claim 19, further comprises selecting an image in a position immediately left of center of the resultant cluster when the LSG is less than the RSG and selecting an image in a position immediately right of center of the resultant cluster when the RSG is less than the LSG.

* * * * *